United States Patent
Park

(10) Patent No.: US 10,584,891 B2
(45) Date of Patent: Mar. 10, 2020

(54) INDOOR ENVIRONMENTAL QUALITY CONTROL DEVICE WITH CARBON DIOXIDE CONCENTRATION CONTROL

(71) Applicant: CONOTEC CO., LTD., Busan (KR)

(72) Inventor: Sung-Back Park, Busan (KR)

(73) Assignee: CONOTEC CO., LTD., Busan (KR)

( * ) Notice: Subject to any disclaimer, the term of this patent is extended or adjusted under 35 U.S.C. 154(b) by 0 days.

(21) Appl. No.: 16/086,224

(22) PCT Filed: Sep. 20, 2017

(86) PCT No.: PCT/KR2017/010299
§ 371 (c)(1),
(2) Date: Sep. 18, 2018

(87) PCT Pub. No.: WO2019/022291
PCT Pub. Date: Jan. 31, 2019

(65) Prior Publication Data
US 2019/0360712 A1    Nov. 28, 2019

(30) Foreign Application Priority Data
Jul. 28, 2017  (KR) .................. 10-2017-0095961

(51) Int. Cl.
| | | |
|---|---|---|
| *B60H 1/00* | (2006.01) | |
| *F24F 11/52* | (2018.01) | |
| *F24F 110/10* | (2018.01) | |
| *F24F 110/70* | (2018.01) | |
| *F24F 110/20* | (2018.01) | |

(52) U.S. Cl.
CPC ........... *F24F 11/52* (2018.01); *F24F 2110/10* (2018.01); *F24F 2110/20* (2018.01); *F24F 2110/70* (2018.01); *F24F 2221/02* (2013.01)

(58) Field of Classification Search
CPC .... F24F 11/52; F24F 2110/20; F24F 2110/10; F24F 2110/70; F24F 2221/02; B60H 1/00892; G05D 23/1917
See application file for complete search history.

(56) References Cited

U.S. PATENT DOCUMENTS

| | | | | |
|---|---|---|---|---|
| 5,395,042 A | * | 3/1995 | Riley | ................. G05D 23/1917 236/46 R |
| 5,528,229 A | * | 6/1996 | Mehta | .................. F04D 25/088 340/3.4 |
| 9,101,026 B2 | * | 8/2015 | Ivey | ........................ F21K 9/272 |
| 9,888,551 B1 | * | 2/2018 | King | ..................... H04W 4/029 |

(Continued)

FOREIGN PATENT DOCUMENTS

| | | |
|---|---|---|
| JP | 2017-023007 A | 2/2017 |
| KR | 10-0684294 B1 | 2/2007 |

(Continued)

*Primary Examiner* — Filip Zec
(74) *Attorney, Agent, or Firm* — Novick, Kim & Lee, PLLC; Jae Youn Kim

(57) ABSTRACT

Provided is an indoor environmental quality control device with a carbon dioxide concentration control, and more particularly an indoor environmental quality control device that is set up in indoor spaces requiring a control of carbon dioxide concentration to provide comfort indoor environments by adjusting the concentration of carbon dioxide to be acceptable for each indoor space and offering temperature and humidity controls.

1 Claim, 5 Drawing Sheets

(56) References Cited

U.S. PATENT DOCUMENTS

| | | | |
|---|---|---|---|
| 2008/0083834 A1* | 4/2008 | Krebs | B60H 1/00892 |
| | | | 237/2 A |
| 2016/0153674 A1* | 6/2016 | Lancaster | H04Q 9/00 |
| | | | 700/276 |
| 2017/0108235 A1* | 4/2017 | Guan | G05B 15/02 |
| 2017/0122616 A1* | 5/2017 | Calabro | G05B 15/00 |
| 2018/0070424 A1* | 3/2018 | Lark, Jr. | H05B 37/0272 |

FOREIGN PATENT DOCUMENTS

| KR | 10-1160986 B1 | 6/2012 |
|---|---|---|
| KR | 10-2017-0073219 A | 6/2017 |

\* cited by examiner

INDOOR ENVIRONMENTAL QUALITY CONTROL DEVICE WITH CARBON DIOXIDE CONCENTRATION CONTROL

BACKGROUND OF THE INVENTION

The present invention relates to an indoor environmental quality control device with a carbon dioxide concentration control, and more particularly to an indoor environmental quality control device that is set up in indoor spaces requiring a control of carbon dioxide concentration to provide comfort indoor environments by adjusting the concentration of carbon dioxide to be acceptable for each indoor space and offering temperature and humidity controls.

The interest in air quality has undeniably heightened along with the environmental degradation resulting from fine dust emissions or the like in recent years.

By volume, dry air from Earth's atmosphere contains 78% nitrogen, 21% oxygen, and small amounts of other gases including carbon dioxide. Carbon dioxide ($CO_2$) at levels that are unusually high indoors may cause occupants to have an increase in respiration and pulse rates and particularly ill or frail people to get heart arrhythmia, fainting, and even death. It is therefore of great importance in hospitals, childcare facilities, or the like to monitor the concentration of carbon dioxide and adjust it through a ventilation system.

Carbon dioxide control is also essential to the cultivation of plants, such as mushrooms. Photosynthesis accounts for the greater part of the growth of plants. The actual level of carbon dioxide ($CO_2$) in the atmosphere is no more than 300 to 350 ppm, which is noticeably less than the carbon dioxide concentration required for the photosynthesis of plants. The level of carbon dioxide ($CO_2$) required for plant growth ranges from 1,000 ppm to 1,500 ppm. The shortage of carbon dioxide ($CO_2$) delays the plant growth and results in a deterioration of plant quality and a drop of crop yield. Hence, the plants in the closed greenhouse use up all carbon dioxide ($CO_2$) in a short period of time of about 20 to 30 minutes, which is the reason that a consistent supply of carbon dioxide ($CO_2$) is necessary in the production of produces with good quality.

PRIOR TECHNICAL DOCUMENTS

Patent Documents (Patent Document 0001) KR 10-2005-0080126 (publicized on Aug. 30, 2005)

BRIEF SUMMARY OF THE INVENTION

It is an object of the present invention to provide an indoor environmental quality control device for measuring the amount of carbon dioxide and making up for a shortage of carbon dioxide in order to maintain a predetermined carbon dioxide level.

It is another object of the present invention to provide an indoor environmental quality control device for measuring temperature and humidity and comparing the temperature and humidity measurements with reference values to create environments suitable for indoor atmosphere.

To achieve the objects of the present invention, there is provided an indoor environmental quality control device with a carbon dioxide concentration control that includes: a carbon dioxide measuring section 110 for measuring the amount of carbon dioxide in an indoor space; a temperature measuring section 120 for measuring the temperature of the indoor space; a humidity measuring section 130 for measuring the humidity of the indoor space; a display section 200 for displaying the carbon dioxide, temperature and humidity measurements acquired from the carbon dioxide measuring section 110, the temperature measuring section 120, and the humidity measuring section 130, respectively; a control panel section 300 for setting a reference carbon dioxide value, a reference temperature value, and a reference humidity value; a measurement evaluating section 400 for comparing the measurements acquired from the carbon dioxide measuring section 110, the temperature measuring section 120, and the humidity measuring section 130 with the reference values predetermined through the control panel section 300; and a control section 500 for sending control signals according to the comparison results acquired through the measurement evaluating section 400.

There is also provided an indoor environmental quality control device with a carbon dioxide concentration control that includes: a carbon dioxide measuring section 110 for measuring the amount of carbon dioxide in an indoor space; a temperature measuring section 120 for measuring the temperature of the indoor space; a humidity measuring section 130 for measuring the humidity of the indoor space; an illuminance measuring section 140 for measuring the illuminance of the indoor space; a display section 200 for displaying the carbon dioxide, temperature, humidity, and illuminance measurements acquired from the carbon dioxide measuring section 110, the temperature measuring section 120, the humidity measuring section 130, and the illuminance measuring section 140, respectively; a control panel section 300 for setting a reference carbon dioxide value, a reference temperature value, a reference humidity value, and a reference illuminance value; a measurement evaluating section 400 for comparing the measurements acquired from the carbon dioxide measuring section 110, the temperature measuring section 120, the humidity measuring section 130, and the illuminance measuring section 140 with the reference values predetermined through the control panel section 300; and a control section 500 for sending control signals according to the comparison results acquired through the measurement evaluating section 400. The control section 500 includes: a carbon dioxide control section 510 for sending a control signal to close a supply valve connected to a carbon dioxide supply device and stop the supply of carbon dioxide when the carbon dioxide measurement is higher than the reference carbon dioxide value as evaluated by the measurement evaluating section 410, and to open the supply value and supply carbon dioxide when the carbon dioxide measurement is lower than the reference carbon dioxide value; a temperature control section 520 for sending a control signal to activate a cooling function when the temperature measurement is higher than the reference temperature value, and to activate a heating function when the temperature measurement is lower than the reference temperature value; and a humidity control section 530 for sending a control signal to activate a dehumidifying function when the humidity measurement is higher than the reference humidity value, and to activate a humidifying function when the humidity measurement is lower than the reference humidity value. The control panel section 300 further includes a channel setting section 303 for setting the reference carbon dioxide value, the reference temperature value, the reference humidity value, and the reference illuminance value by the timeslot.

Effects of Invention

The present invention may provide an indoor environmental quality control device that measures the amount of carbon dioxide and makes a control to make up for a shortage of carbon dioxide in order to maintain a predetermined carbon dioxide level. The indoor environmental quality control device also gauges temperature and humidity and compares the temperature and humidity measurements with the reference values to create environments suitable for indoor atmosphere. The amenities suitable for each environment can be provided by selecting either a plant cultivation mode or an indoor air cleaning mode. Particularly, the present invention offers a real-time control of the environments for the cultivation of plants, such as mushrooms and ginseng, which are expensive and difficult to control, thereby making an effect to raise the crop yield of the plants.

BRIEF DESCRIPTION OF THE SEVERAL VIEW OF THE DRAWING

BEST MODES FOR CARRYING OUT THE INVENTION

Figure 1:
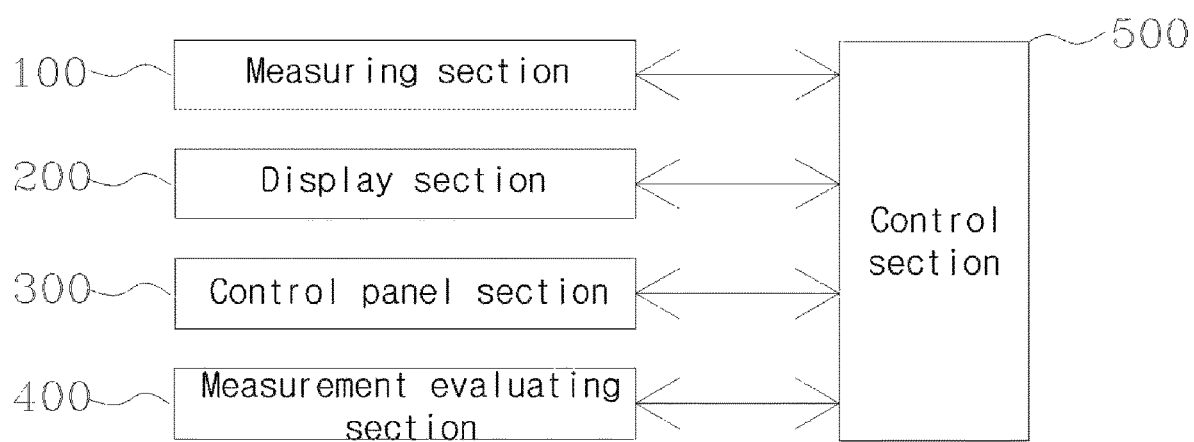
FIG. 1 is a block diagram according to an embodiment of the present invention.

The best modes for carrying out the invention are as follows:

(1) An indoor environmental quality control device with a carbon dioxide concentration control that includes: a carbon dioxide measuring section 110 for measuring the amount of carbon dioxide in an indoor space; a temperature measuring section 120 for measuring the temperature of the indoor space; a humidity measuring section 130 for measuring the humidity of the indoor space; a display section 200 for displaying the carbon dioxide, temperature and humidity measurements acquired from the carbon dioxide measuring section 110, the temperature measuring section 120, and the humidity measuring section 130, respectively; a control panel section 300 for setting a reference carbon dioxide value, a reference temperature value, and a reference humidity value; a measurement evaluating section 400 for comparing the measurements acquired from the carbon dioxide measuring section 110, the temperature measuring section 120, and the humidity measuring section 130 with the reference values predetermined through the control panel section 300; and a control section 500 for sending control signals according to the comparison results acquired through the measurement evaluating section 400.

(2) An indoor environmental quality control device with a carbon dioxide concentration control that includes: a carbon dioxide measuring section 110 for measuring the amount of carbon dioxide in an indoor space; a temperature measuring section 120 for measuring the temperature of the indoor space; a humidity measuring section 130 for measuring the humidity of the indoor space; an illuminance measuring section 140 for measuring the illuminance of the indoor space; a display section 200 for displaying the carbon dioxide, temperature, humidity, and illuminance measurements acquired from the carbon dioxide measuring section 110, the temperature measuring section 120, the humidity measuring section 130, and the illuminance measuring section 140, respectively; a control panel section 300 for setting a reference carbon dioxide value, a reference temperature value, a reference humidity value, and a reference illuminance value; a measurement evaluating section 400 for comparing the measurements acquired from the carbon dioxide measuring section 110, the temperature measuring section 120, the humidity measuring section 130, and the illuminance measuring section 140 with the reference values predetermined through the control panel section 300; and a control section 500 for sending control signals according to the comparison results acquired through the measurement evaluating section 400. The control section 500 includes: a carbon dioxide control section 510 for sending a control signal to close a supply valve connected to a carbon dioxide supply device and stop the supply of carbon dioxide when the carbon dioxide measurement is higher than the reference carbon dioxide value as evaluated by the measurement evaluating section 410, and to open the supply value and supply carbon dioxide when the carbon dioxide measurement is lower than the reference carbon dioxide value; a temperature control section 520 for sending a control signal to activate a cooling function when the temperature measurement is higher than the reference temperature value, and to activate a heating function when the temperature measurement is lower than the reference temperature value; and a humidity control section 530 for sending a control signal to activate a dehumidifying function when the humidity measurement is higher than the reference humidity value, and to activate a humidifying function when the humidity measurement is lower than the reference humidity value. The control panel section 300 further includes a channel setting section 303 for setting the reference carbon dioxide value, the reference temperature value, the reference humidity value, and the reference illuminance value by the timeslot.

DETAILED DESCRIPTION OF THE INVENTION

Hereinafter, a detailed description will be given as to the present invention with reference to the accompanying drawings in order for those skilled in the art to carry out the invention.

FIG. 1 is a block diagram showing an indoor environmental quality control device with a carbon dioxide concentration control in accordance with an embodiment of the present invention (hereinafter, referred to as "indoor environmental quality control device").

The indoor environmental quality control device of the present invention makes a control to maintain carbon dioxide, temperature and humidity levels in the indoor space of a building structure.

As show in FIG. 1, the indoor environmental quality control device is constructed to include a measuring section 100, a display section 200, a control panel section 300, a measurement evaluating section 400, and a control section 500.

In this regard, the individual components can be described more specifically as follows.

Figure 2:
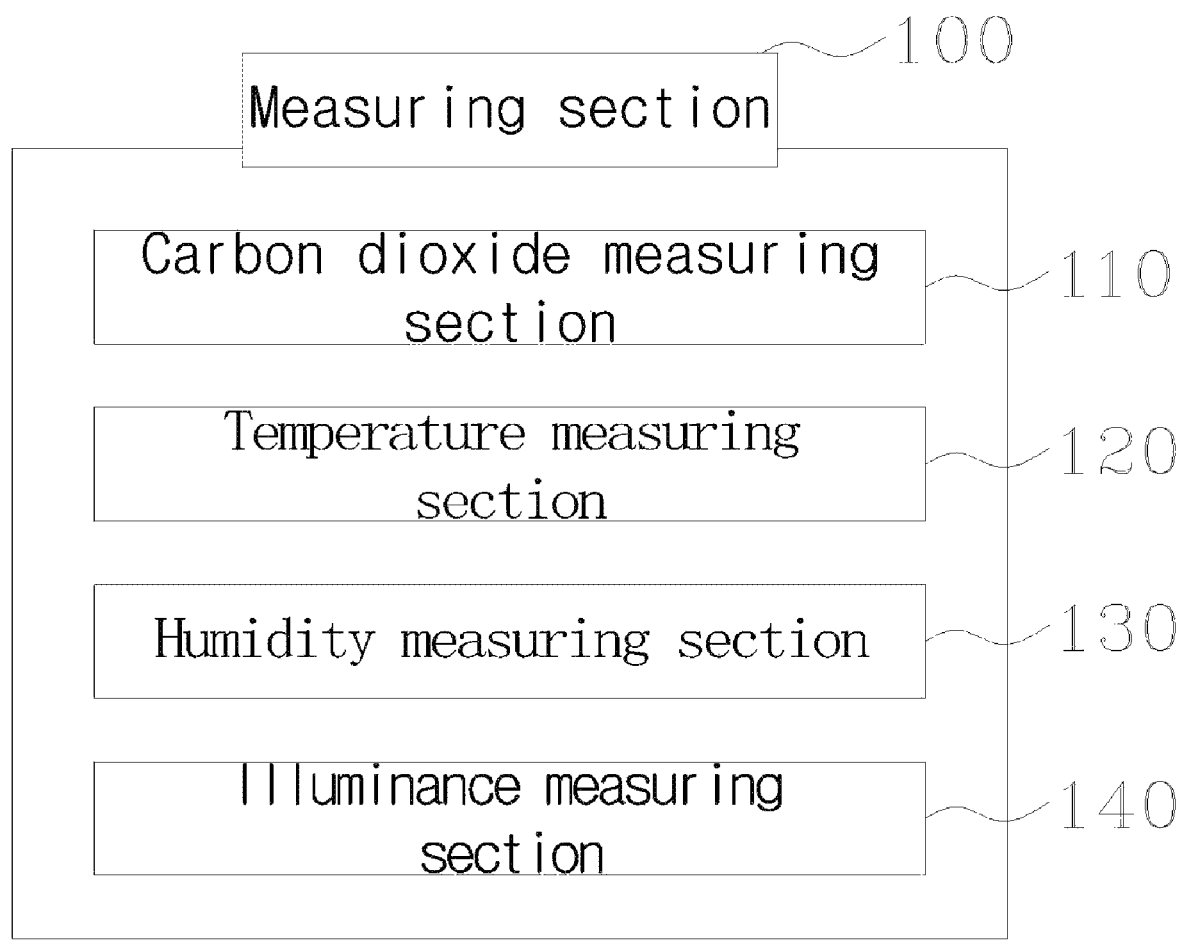
FIG. 2 is a block diagram showing the measuring section of the present invention.

Referring to FIG. 2, the measuring section 100 is designed to acquire the measurements of carbon dioxide concentration, temperature, and humidity and includes a carbon dioxide measuring section 110, a temperature measuring section 120, a humidity measuring section 130, and an illuminance measuring section 140.

The carbon dioxide measuring section 110 is formed on the one side of the indoor environmental quality control device to measure the amount of carbon dioxide in the indoor space. The carbon dioxide measuring section 110 may further include a moisture eliminating section 111. The moisture eliminating section 111 is for eliminating moisture from the region being supplied with carbon dioxide while the carbon dioxide measuring section 110 is measuring the amount of carbon dioxide in the indoor space, and also for aiding the supply of carbon dioxide for the carbon dioxide measuring section 110. In the indoor environmental quality control device equipped with the carbon dioxide measuring section 110, the moisture eliminating section 111 may be placed on the front side of the carbon dioxide measuring section 110 so that the carbon dioxide measuring section 110 can measure the amount of carbon dioxide passing the moisture eliminating section 111. The carbon dioxide measuring section 110 may be provided in the form of a cylinder projecting outwardly, with the one side open to receive carbon dioxide and the other having the moisture eliminating section 111. Such a structure enables the carbon dioxide measuring section 110 to measure the amount of carbon dioxide passing the moisture eliminating section 111.

The temperature measuring section 120 is for measuring the temperature of the indoor space, and the humidity measuring section 130 is for measuring the humidity of the indoor space.

The temperature measuring section 120 and the humidity measuring section 130 are formed on the one side of the indoor environmental quality control device. The device may further include a housing for holding the temperature measuring section 120 and the humidity measuring section 130. For example, the temperature measuring section 120 and the humidity measuring section 130 may be provided in the form of sensor chips and placed in the housing to gauge the temperature and humidity of the indoor space, respectively.

Furthermore, the housing may have a plurality of passage holes on the surface so that it does not interfere with the measurement of the temperature and humidity in the indoor space.

The illuminance measuring section 140 is formed to measure the illuminance of the indoor space.

The display section 200 displays the carbon dioxide, temperature, humidity, and illuminance measurements acquired from the carbon dioxide measuring section 110, the temperature measuring section 120, the humidity measuring section 130, and the illuminance measuring section 140, respectively.

The display section 200 may provide a display on the monitor so that the user can set the reference values through the control panel section 300.

The display section 200 displays information about temperature, humidity, carbon dioxide concentration, and illuminance. In addition, a sensor error correcting section may be further provided to correct the errors of the individual measurements acquired by the measuring section 100, so the display section 200 can display the measurements with more accuracy.

Figure 3:
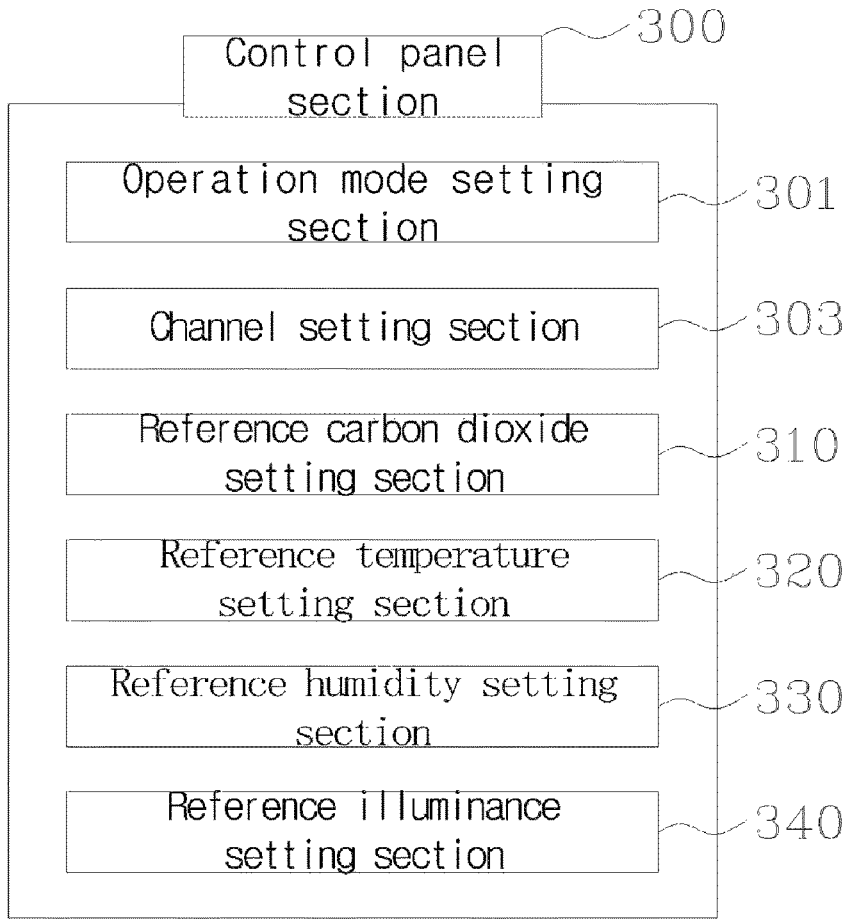
FIG. 3 is a block diagram showing the control panel section of the present invention.

The control panel section 300 is for setting a reference carbon dioxide value, a reference temperature value, a reference humidity value, and a reference illuminance value. As illustrated in the block diagram of FIG. 3, the control panel section 300 is divided into a reference carbon dioxide setting section 310, a reference temperature setting section 320, a reference humidity setting section 330, and a reference illuminance setting section 340 to set the respective reference values.

Firstly, the control panel section 300 further includes an operation mode setting section 301, which is for making a control of a designated environment set with carbon dioxide concentration, temperature, humidity, etc. varied depending on the desired environment of the indoor space. Namely, the operation mode setting section 301 may set either a plant cultivation mode for cultivation of plants such as mushrooms or an indoor air cleaning mode for cleaning the indoor environment such as in a hospital or childcare facility according to the user's choice.

The plant cultivation mode is used in the case of cultivating vegetables, such as tomatoes, cucumbers, or peppers, Ornithogalum, such as royal azalea or begonia, cutflowers, such as carnations or roses, or mushrooms, and designed to control carbon dioxide concentration, temperature, or humidity for the purpose of creating environments suitable for the growth of the individual plants. The role of illuminance (light) as well as temperature, humidity, and carbon dioxide is of great importance particularly in the cultivation of mushrooms like shiitake. It is therefore necessary to manage the indoor environment so that the illuminance is maintained at a level appropriate to each plant.

The indoor air cleaning mode is selected by the user to control carbon dioxide concentration, temperature, and humidity for the purpose of providing environments suitable for the indoor space of a hospital or childcare facility.

The reference carbon dioxide setting section 310 is for setting the range of the reference carbon dioxide value and the duration for carbon dioxide emission. The reference temperature setting section 320 is for setting the range of the reference temperature value. The reference humidity setting section 330 is for setting the range of the reference humidity value. And, the reference illuminance setting section 340 is for setting the range of the reference illuminance value based on the weather.

A detailed description is given below as to the embodiments of the present invention for setting the individual reference values through the control panel section 300 in the plant cultivation mode and in the indoor air cleaning mode, separately.

In order to activate the plant cultivation mode, the user sets a reference carbon dioxide value, a reference temperature value, a reference humidity value, and a reference illuminance value for a control of the environments for plant cultivation.

In the plant cultivation mode, it is necessary to control the environments for plant cultivation with the reference values varied by the timeslot. For this, the channel setting section 303 divides one day (24 hours) into nine time slots, that is, Channels 1 to 9, so that the reference temperature value, the reference humidity value, and the reference carbon dioxide value can be set separately for each channel to make a control of the environments for plant cultivation.

It can be assumed, for example, that the user sets the time into four channels through the control panel as follows.

[Channel 1: 04:00/Channel 2: 10:30/Channel 3: 16:20/Channel 4: 23:00]

With these time allocations, the channel-based operational time range is set as 04:00 to 10:20 for Channel 1, 10:20 to 16:20for Channel 2, 16:20 to 23:00 for channel 3, and 23:00 to 04:00for Channel 4, so the environments for plant cultivation can be controlled according to the reference carbon dioxide value, the reference temperature value, the reference humidity value, and the reference illuminance value, which are separately set for each channel.

In the plant cultivation mode, the reference carbon dioxide setting section 310 sets the reference carbon dioxide value varied depending on the use of the illuminance measuring section 140.

Upon selecting the use of the illuminance measuring section 140 through the reference illuminance setting section 340, the user sets both a clear-day carbon dioxide value and a cloudy-day carbon dioxide value through the reference carbon dioxide setting section 310 to control the amount of carbon dioxide. When selecting no use of the illuminance measuring section 140, the user has only to set the cloudy-day carbon dioxide value alone to control the amount of carbon dioxide.

Using the reference carbon dioxide setting section 310 in the plant cultivation mode, the user may select the ventilation mode for drawing off the carbon dioxide from the indoor space and set the range of the reference carbon dioxide value for ventilation so that the ventilation mode is activated when the carbon dioxide measurement exceeds the reference carbon dioxide value for ventilation.

Figure 4:
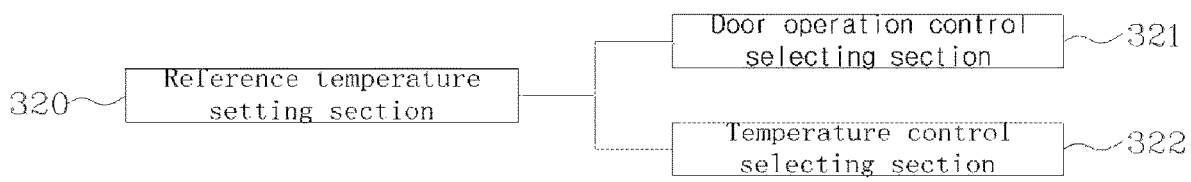
FIG. 4 is a block diagram showing the temperature reference setting section of the present invention.

As shown in FIG. 4, the reference temperature setting section 320 may be divided into a door operation control selecting section 321 and a temperature control selecting section 322.

The door operation control selecting section 321 is setting the range of the reference temperature value for door opening and closing operations so that the door of a greenhouse is operated to open or close according to the results of a comparison between the reference temperature value and the temperature measurement in an indoor space like a greenhouse in which plants are grown.

Through a temperature measurement evaluating section 420, a comparison is made between the temperature measurement and the reference temperature value for door opening and closing operations. The control section 500 activates a door opening function to open the door of the greenhouse when the temperature measurement is higher than the reference temperature value for door opening and closing operations; and a door closing function to close the door of the greenhouse when the temperature measurement is lower than the reference temperature value for door opening and closing operations.

The temperature control selecting section 322 is for setting the range of the reference temperature value for cooling and heating operations to turn on a cooler or a heater installed in the greenhouse through a cooling/heating function.

The cooling function is activated to operate the cooler when the temperature measurement is higher than the reference temperature value for cooling and heating operations as set through the temperature control selecting section 322; whereas the heating function is activated to operate the heater when the temperature measurement is lower than the reference temperature value for cooling and heating operations.

The reference humidity setting section 330 enables the user to select a humidifying mode for activation of a humidifying function or a dehumidifying mode for activation of a dehumidifying function and to set the reference humidity values for the humidifying and dehumidifying modes separately. In the humidifying mode set by the choice of the user, the humidifying function is activated when the humidity measurement is lower than the reference humidity value; whereas in the dehumidifying mode set by the choice of the user, the dehumidifying function is activated when the humidity measurement is higher than the reference humidity value.

The reference illuminance setting section 340 has a function of turning the illuminance measuring section 140 'ON' or 'OFF' and enables the user to select the use of the illuminance measuring section 140.

The reference illuminance setting section 340 enables the user to set a weather-based reference illuminance value through a clear-day illuminance setting function and a cloudy-day illuminance setting function. The term "weather-based reference illuminance value" as used herein refers to a reference illuminance value based on the weather that enables the user to facilitate the cultivation of plants using illuminance according to the weather. The user can select the clear-day illuminance setting function to set a clear-day illuminance value or the cloudy-day illuminance setting function to set a cloudy-day illuminance value.

The reference illuminance values set through the reference illuminance setting section 340 are used in association with the reference carbon dioxide values set through the reference carbon dioxide setting section 310 in the control of the environments for plant cultivation.

Upon the user operating the reference illuminance setting section 340 to turn the illuminance measuring section 140 ON and selecting the clear-day illuminance setting function to set a clear-day illuminance value, the clear-day carbon dioxide value set as a reference value through the reference carbon dioxide setting section 310 is compared with the carbon dioxide measurement gauged through the carbon dioxide measuring section 110 to control the amount of carbon dioxide. Likewise, upon the user selecting the cloudy-day illuminance setting function to set a cloudy-day illuminance value, the cloudy-day carbon dioxide value set as a reference value through the reference carbon dioxide setting section 310 is compared with the carbon dioxide measurement gauged through the carbon dioxide measuring section 110 to control the amount of carbon dioxide.

The following description is given as to the procedures of setting the reference carbon dioxide value, the reference temperature value, and the reference humidity value in order to activate the indoor air cleaning mode. The illuminance is not specifically required in the indoor air cleaning mode, so it is not necessary to set the reference illuminance value through the reference illuminance setting section 340. If needed, the reference illuminance value may be set according to the environments of the indoor space.

The reference carbon dioxide setting section 310 is for setting the range of the reference carbon dioxide value in order to control the amount of carbon dioxide suitable for the indoor environments.

It is controlled to activate the ventilation function for replacing indoor air when the reference carbon dioxide value set through the reference carbon dioxide setting section 310 is higher than the carbon dioxide measurement gauged through the carbon dioxide measuring section 110 (i.e., the reference carbon dioxide value>the carbon dioxide measurement).

The reference temperature setting section 320 is for setting the range of the reference temperature value in order to maintain the temperature of the indoor space suitable for the indoor environments.

It is controlled in the way that the cooling function is activated to turn on the cooler when the reference temperature value is lower than the temperature measurement gauged through the temperature measuring section 120 (i.e., the reference temperature value <the temperature measurement), whereas the heating function is activated to turn on the heater when the reference temperature value is higher than the temperature measurement (i.e., the reference temperature value>the temperature measurement).

The reference humidity setting section 330 is for setting the range of the reference humidity value in order to maintain the humidity of the indoor space suitable for the indoor environments.

It is controlled in the way that the dehumidifying function is activated when the reference humidity value is lower than the humidity measurement gauged through the humidity measuring section 130 (i.e., the reference humidity value <the humidity measurement), whereas the humidifying function is activated when the reference humidity value is higher than the humidity measurement (i.e., the reference humidity value>the humidity measurement).

The measurement evaluating section 400 is for comparing the reference value predetermined through the control panel section 300 with the measurement value determined through the measuring section 100. Namely, the measurement evaluating section 400 is used to compare the measurement values acquired from the carbon dioxide measuring section 110, the temperature measuring section 120, the humidity measuring section 130, and the illuminance measuring section 140 of the measuring section 100 with the reference values predetermined through the reference carbon dioxide setting section 310, the reference temperature setting section 320, the reference humidity setting section 330, and the reference illuminance setting section 340 of the control panel section 300, respectively.

Figure 5:
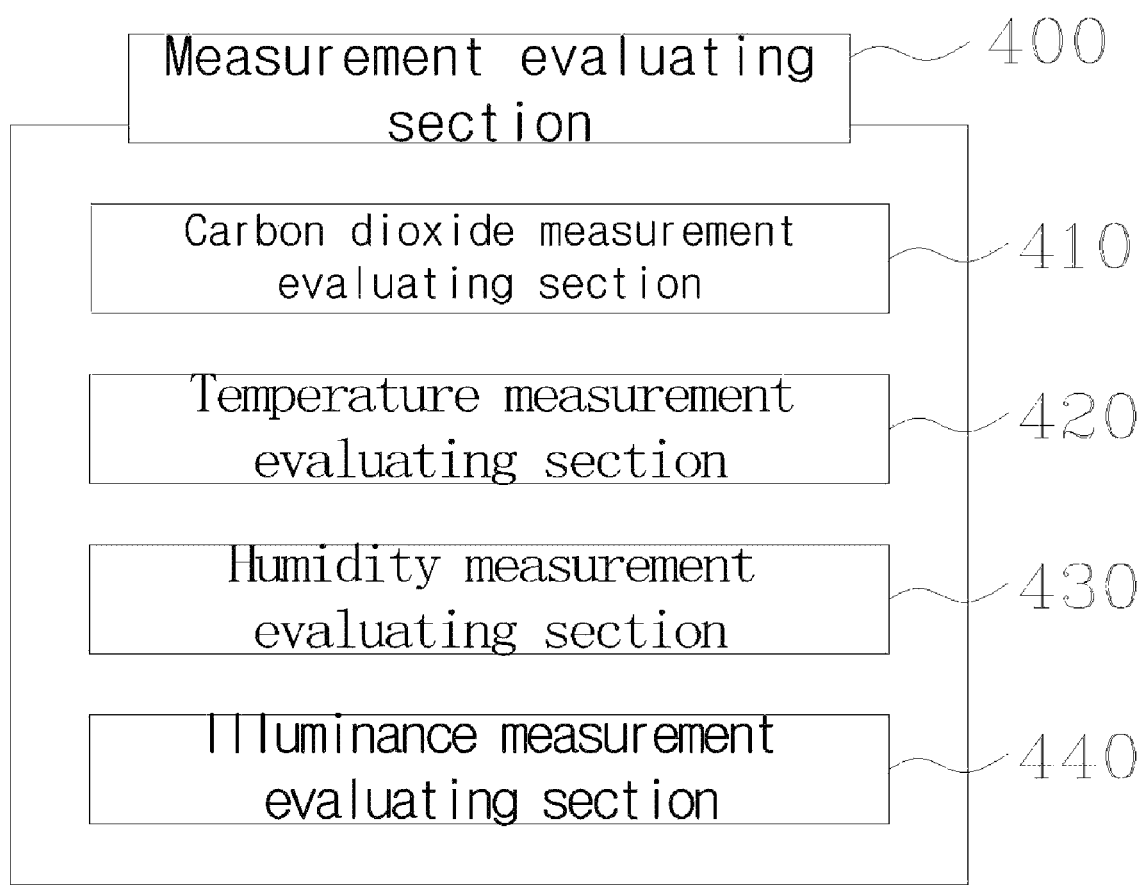
FIG. 5 is a block diagram showing the measurement evaluating section of the present invention.

As shown in FIG. 5, the measurement evaluating section 400 may be divided into a carbon dioxide measurement evaluating section 410, a temperature measurement evaluating section 420, a humidity measurement evaluating section 430, and an illuminance measurement evaluating section 440, each of which makes a corresponding comparison.

The carbon dioxide measurement evaluating section 410 compares the carbon dioxide measurement with the reference carbon dioxide value and determines whether the carbon dioxide measurement is higher than the reference carbon dioxide value or not.

The temperature measurement evaluating section 420 compares the temperature measurement with the reference temperature value and determines whether the temperature measurement is higher than the reference temperature value or not.

The humidity measurement evaluating section 430 compares the humidity measurement with the reference humidity value and determines whether the humidity measurement is higher than the reference humidity value or not.

The illuminance measurement evaluating section 440 compares the illuminance measurement with the reference illuminance value and determines whether the illuminance measurement is higher than the reference illuminance value or not.

Upon the user selecting 'ON' for the illuminance measuring section 140 and setting a clear-day illuminance value and a cloudy-day illuminance value, the illuminance measurement evaluating section 440 determines whether the illuminance measurement gauged through the illuminance measuring section 140 is higher than the clear-day illuminance value (i.e., the illuminance measurement >the clear-day illuminance value); whether the illuminance measurement is a value between the clear-day illuminance value and the cloudy-day illuminance value (i.e., the clear-day illuminance value>the illuminance measurement>the cloudy-day illuminance value); and whether the illuminance measurement is lower than the cloudy-day illuminance value (i.e., illuminance measurement<cloudy-day illuminance value).

The control section 500 sends a control signal according to the comparison results acquired from the measurement evaluating section 400.

Figure 6:
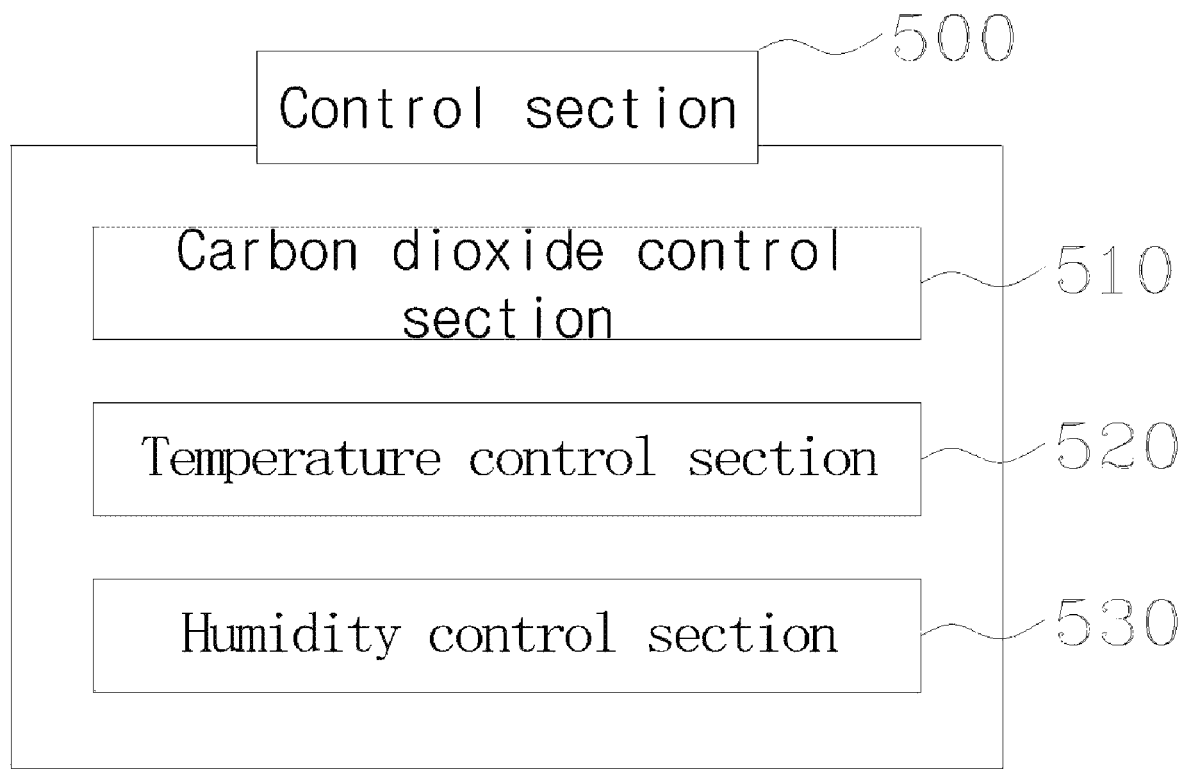
FIG. 6 is a block diagram showing the control section of the present invention.

As shown in FIG. 6, the control section 500 may be divided into a carbon dioxide control section 510, a temperature control section 520, and a humidity control section 530, each of which makes a control for the corresponding operation.

The carbon dioxide control section 510 sends a control signal to close the supply valve connected to the carbon dioxide supply device for supplying carbon dioxide when the carbon dioxide measurement is higher than the reference carbon dioxide value (i.e., the carbon dioxide measurement >the reference carbon dioxide value) as determined by the carbon dioxide evaluating section 410; and to open the supply valve for supplying carbon dioxide when the carbon dioxide measurement is lower than the reference carbon dioxide value.

Upon setting the plant cultivation mode through the operation mode setting section 301 of the control panel section 300 and selecting 'ON' for the illuminance measuring section 140 through the reference illuminance setting section 340, the user additionally sets a clear-day illuminance value through the reference illuminance setting section 340 in the case of a clear day.

As the illuminance measuring section is 'ON', the user may use the reference carbon dioxide setting section 310 to set either a clear-day carbon dioxide value or a cloudy-day carbon dioxide value. In the case of a clear day, the user sets a clear-day carbon dioxide value.

The carbon dioxide measurement evaluating section 410 compares the carbon dioxide measurement gauged through the carbon dioxide measuring section 110 with the clear-day carbon dioxide value set through the reference carbon dioxide setting section 310.

When the carbon dioxide measurement is higher than the clear-day carbon dioxide value (i.e., the carbon dioxide measurement>the clear-day carbon dioxide value), a control signal is sent to close the supply valve connected to the carbon dioxide supply device so that no more carbon dioxide is supplied for the indoor cultivation space. With the carbon dioxide measurement lower than the clear-day carbon dioxide value (i.e., the carbon dioxide measurement<the clear-day carbon dioxide value), a control signal is sent to open the supply valve connected to the carbon dioxide supply device in order to increase the amount of carbon dioxide in the indoor cultivation space, so carbon dioxide is forced into the indoor cultivation space.

Likewise, in a cloudy day, the carbon dioxide measurement evaluating section 410 compares the carbon dioxide measurement with the predetermined cloudy-day carbon dioxide value, and the carbon dioxide control section 510 makes a control to open or close the supply valve of the carbon dioxide supply device according to the comparison results.

Upon the user selecting the ventilation function and setting a carbon dioxide value for ventilation through the reference carbon dioxide setting section 310, the carbon dioxide measurement evaluating section 410 compares the carbon dioxide value for ventilation with the carbon dioxide measurement gauged through the carbon dioxide measuring section 110.

According to the comparison results from the carbon dioxide measurement evaluating section 410, the carbon dioxide control section 510 sends a control signal to activate the ventilation function for drawing the carbon dioxide off from the indoor space when the carbon dioxide measurement is higher than the carbon dioxide value for ventilation (i.e., the carbon dioxide value for ventilation <the carbon dioxide measurement).

The carbon dioxide control section 510 receives the evaluation value from the illumination measurement evaluating section 440 and controls the supply of carbon dioxide according to the evaluation results of the illuminance measurement evaluating section 440. More specifically, a control signal is sent to close the supply valve and disconnect the supply of carbon dioxide upon receiving the evaluation results that the illuminance measurement is lower than the cloudy-day illuminance value (i.e., the illuminance measurement<the cloudy-day illuminance value).

Upon the user selecting the indoor air cleaning mode, the carbon dioxide control section 510 determines whether to activate the ventilation function according to the comparison of the reference carbon dioxide value and the carbon dioxide measurement.

The temperature control section 520 sends a control signal to activate a cooling function when the temperature measurement is higher than the reference temperature value or a heating function when the temperature measurement is lower than the reference temperature value.

The temperature control section 520 makes a control to perform the following functions upon receiving a signal of the plant cultivation mode selected by the operation mode setting section 310.

In the plant cultivation mode, a control signal is sent to set a reference temperature value for door opening and closing operations through the door operation control section 321 of the reference temperature setting section 320 and to compare the reference temperature value for door opening and closing operations with the temperature measurement, so either the door opening function or the door closing function for plant cultivation is activated according to the comparison results.

In other words, the control section 500 makes a control according to the evaluation results of the temperature measurement evaluating section 420 to activate the door opening function for opening the door of the greenhouse when the temperature measurement is higher than the reference temperature value or the door closing function for closing the door of the greenhouse when the temperature measurement is lower than the reference temperature value.

In addition, a control signal is sent to set a reference temperature value for cooling and heating operations through the temperature control selecting section 322 of the reference temperature setting section 320 and to compare the reference temperature value for cooling and heating operations with the temperature measurement, so either the cooling function with a cooler or the heating function with a heater is activated according to the comparison results.

Namely, the temperature of the indoor space can be controlled in the way that the cooler is 'ON' through the cooling function when the temperature measurement is higher than the reference value for cooling and heating operations (i.e., the reference value for cooling and heating operations<the temperature measurement), whereas the heater is 'ON' through the heating function when the temperature measurement is lower than the reference value for cooling and heating operations (i.e., the reference value for cooling and heating operations>the temperature measurement).

By contrast, when the operation mode setting section 310 selects the indoor air cleaning mode and sends the selection signal of the indoor air cleaning mode to the temperature control section 520, a control signal is sent to set the reference temperature value for cooling and heating operations solely and to compare the reference temperature for cooling and heating operations with the temperature measurement, so either the cooling function or the heating function is activated according to the comparison results.

The humidity control section 530 sends a control signal to activate the dehumidifying function when the humidity measurement is higher than the reference humidity value and the humidifying function when the humidity measurement is lower than the reference humidity value.

Upon receiving a selection signal of the humidifying mode from the reference humidity setting section 330, the humidify control section 530 sends a control signal to activate the humidifying function when the humidity measurement is lower than the reference humidity value (i.e., the reference humidity value>the humidity measurement) as determined by the humidity measurement evaluating section 430.

Contrarily, upon receiving a selection signal of the dehumidifying mode from the reference humidity setting section 330, the humidify control section 530 sends a control signal to activate the dehumidifying function when the humidity measurement is considered higher than the reference humidity value (i.e., the reference humidity value<the humidity measurement).

The indoor environmental quality control device of the present invention may further include a power source connection port for connection to a power source, and a signal connecting section. The signal connecting section is provided for signal input/output with an external device and connected to the measuring section 100, an external device, a power adaptor, etc.

The indoor environmental quality control device may further include an alarm generating section for generating an alarm when the carbon dioxide measurement, the temperature measurement, the humidity measurement, or the illuminance measurement is higher than a predetermined alarm-generating upper limit or lower than a predetermined alarm-generating lower limit; and an alarm deviation acquiring section for acquiring information for determination of a hysteresis width between alarm generation and cancellation when each measurement is higher than the alarm upper limit or lower than the alarm lower limit.

For communications with an external device, the present invention may include setting a communication address, a communication speed, and a connection method. The communication address is set, for example, by assigning addresses 1 to 99 to the individual text messaging means during a serial communication to identify the individual devices. The communication speed is set as the data rate during a serial communication. In the case of RS485 as a connection method, the communication speed may be set as 1200 bps, 2400 bps, 4800 bps, 9600 bps, 19200 bps, etc.

The foregoing description of a preferred embodiment of the invention has been presented for purposes of illustration and description. It is not intended to be exhaustive or to limit the invention to the precise form disclosed, and obviously many substitutions, modifications and variations are possible in light of the above teaching.

INDUSTRIAL APPLICABILITY

The present invention is directed to an indoor environmental quality control device designed to control the indoor environments by gauging the amount of carbon dioxide in the indoor space and making up for the shortage of carbon dioxide in order to maintain a predetermined level of carbon dioxide. Particularly, the indoor environmental quality control device is applicable to the cultivation of plants as it enables a real-time control of the environments for the growth of plants such as mushrooms and ginseng that are inexpensive and difficult to care for.

What is claimed is:

1. An indoor environmental quality control device with a carbon dioxide concentration control, comprising:
    a carbon dioxide measuring section for measuring an amount of carbon dioxide in an indoor space;
    a temperature measuring section for measuring a temperature of the indoor space;
    a humidity measuring section for measuring humidity of the indoor space;
    an illuminance measuring section for measuring illuminance of the indoor space;
    a display section for displaying measurements of the amount of carbon dioxide, the temperature, the humidity, and the illuminance acquired from the carbon dioxide measuring section, the temperature measuring section, the humidity measuring section, and the illuminance measuring section, respectively;
    a control panel section for setting a reference carbon dioxide value, a reference temperature value, a reference humidity value, and a reference illuminance value;
    a measurement evaluating section for comparing the measurements acquired from the carbon dioxide measuring section, the temperature measuring section, the humidity measuring section, and the illuminance measuring section with the reference values predetermined through the control panel section; and
    a control section for sending control signals according to comparison results acquired through the measurement evaluating section,
    wherein the carbon dioxide measuring section further comprises a moisture eliminating section for eliminating moisture produced during a supply of carbon dioxide,
    wherein the control panel section comprises:
    an operation mode setting section for selecting either a plant cultivation mode for cultivation of plants or an indoor air cleaning mode for cleaning the indoor environment;
    a channel setting section for setting the reference carbon dioxide value, the reference temperature value, the reference humidity value, and the reference illuminance value by a timeslot;
    a reference carbon dioxide setting section for setting a range of the reference carbon dioxide value and a duration for carbon dioxide emission;
    a reference temperature setting section for setting a range of the reference temperature value;
    a reference humidity setting section for setting a range of the reference humidity value; and
    a reference illuminance setting section for setting a range of the reference illuminance value based on a weather and determining whether to use the illuminance measuring section or not,
    wherein the measurement evaluating section comprises:
    a temperature measurement evaluating section for comparing the temperature measurement acquired through the temperature measuring section with the reference temperature value determined through the reference temperature setting section and determining whether the temperature measurement is higher than the reference temperature value or not;
    a humidity measurement evaluating section for comparing the humidity measurement acquired through the humidity measuring section with the reference humidity value determined through the reference humidity setting section and determining whether the humidity measurement is higher than the reference humidity value or not; and
    an illuminance measurement evaluating section being activated when the reference illuminance setting section is used to select a use of the illuminance measuring section and set a clear-day illuminance value and a cloudy-day illuminance value, to determine whether the illuminance measurement acquired through the illuminance measuring section is higher than the clear-day illuminance value, whether the illuminance measurement is a value between the clear-day illuminance value and the cloudy-day illuminance value, and whether the illuminance measurement is lower than the cloudy-day illuminance value,
    wherein the control section comprises:
    a carbon dioxide control section for sending a control signal to close a supply valve connected to a carbon dioxide supply device and stop the supply of carbon dioxide when the carbon dioxide measurement is higher than the reference carbon dioxide value as evaluated by a carbon dioxide measurement evaluating section, and to open the supply valve and supply carbon dioxide when the carbon dioxide measurement is lower than the reference carbon dioxide value;
    a temperature control section for sending a control signal to activate a cooling function when the temperature measurement is higher than the reference temperature value, and to activate a heating function when the temperature measurement is lower than the reference temperature value; and
    a humidity control section for sending a control signal to activate a dehumidifying function when the humidity measurement is higher than the reference humidity value, and to activate a humidifying function when the humidity measurement is lower than the reference humidity value,
    wherein the plant cultivation mode is a mode for providing environments suitable for a growth of vegetables, Ornithogalum, cutflowers, or mushrooms, and the indoor air cleaning mode is a mode for providing environments suitable for indoor atmosphere of a hospital or a childcare facility,
    wherein when the use of the illuminance measuring section is selected through the reference illuminance setting section in the plant cultivation mode as selected through the operation mode setting section, the reference carbon dioxide setting section is used to set a clear-day carbon dioxide value and a cloudy-day carbon dioxide value in order to control the amount of carbon dioxide in the indoor space for plant cultivation; and
    when the use of the illuminance measuring section is not selected through the reference illuminance setting section in the plant cultivation mode as selected through the operation mode setting section, the reference carbon dioxide setting section is used to set the cloudy-day carbon dioxide value in order to control the amount of carbon dioxide in the indoor space for plant cultivation, wherein the reference carbon dioxide setting section comprises a ventilation mode for drawing off carbon dioxide from the indoor space,
upon selection of the ventilation mode, the reference carbon dioxide setting section being used to set the range of the reference carbon dioxide value for ventilation,
the measurement evaluating section comparing the carbon dioxide measurement with the reference carbon dioxide value for ventilation,
upon evaluation that the carbon dioxide measurement exceeds the reference carbon dioxide value for ventilation, the measurement evaluating section sending a control signal to the control section to activate the ventilation mode,
wherein the reference temperature setting section comprises:
a door operation control selecting section for setting the range of the reference temperature value for door opening and closing operations so that a door of the indoor space for plant cultivation is operated to open or close according to results of a comparison between the reference temperature value and the temperature measurement in the indoor space; and
a temperature control selecting section for setting the range of the reference temperature value for cooling and heating operations to turn on either a cooler or a heater installed in the indoor space,
the measurement evaluating section comparing the temperature measurement acquired through the temperature measuring section with the reference temperature value for door opening and closing operations determined through the door operation control selecting section, and sending a control signal to the control section to open the door of the indoor space when the temperature measurement is higher than the reference temperature value for door opening and closing operations and to close the door of the indoor space when the temperature measurement is lower than the reference temperature value for door opening and closing operations,
the measurement evaluating section sending a control signal to the control section to activate the cooler when the temperature measurement acquired through the temperature measuring section is higher than the reference temperature value for cooling and heating operations determined through the temperature control selecting section and to activate the heater when the temperature measurement is lower than the reference temperature value for cooling and heating operations,
wherein the reference humidity setting section is used to select either a humidifying mode or a dehumidifying mode,
the humidifying mode being selected to activate a humidifying function when the humidity measurement is lower than the reference humidity value,
the dehumidifying mode being selected to activate a dehumidifying function when the humidity measurement is higher than the reference humidity value,
wherein the reference illuminance setting section comprises an ON/OFF function for the illuminance measuring section to select whether to use the illuminance measuring section or not,
the reference illuminance setting section comprising a clear-day illuminance setting function for setting the clear-day illuminance value and a cloudy-day illuminance setting function for setting the cloudy-day illuminance value,
the reference illuminance setting section setting a weather-based reference illuminance value by selection of either the clear-day illuminance setting function or the cloudy-day illuminance setting function.

* * * * *